United States Patent
Yuan et al.

(10) Patent No.: US 12,187,648 B2
(45) Date of Patent: Jan. 7, 2025

(54) MODIFIED CALCINED KAOLIN PARTICLE WITH SURFACE AMPHIPHILICITY AND PREPARATION METHOD THEREOF

(71) Applicant: HUNAN INSTITUTE OF SCIENCE AND TECHNOLOGY, Yueyang (CN)

(72) Inventors: Yongbing Yuan, Yueyang (CN); Xinyu Tang, Yueyang (CN); Junkang Shi, Yueyang (CN); Congshan Zhou, Yueyang (CN); Shuqin Zheng, Yueyang (CN); Lijun Li, Yueyang (CN); An Li, Yueyang (CN); Jundong Xu, Yueyang (CN)

(73) Assignee: HUNAN INSTITUTE OF SCIENCE AND TECHNOLOGY, Yueyang (CN)

( * ) Notice: Subject to any disclaimer, the term of this patent is extended or adjusted under 35 U.S.C. 154(b) by 0 days.

(21) Appl. No.: 18/802,061

(22) Filed: Aug. 13, 2024

(65) Prior Publication Data
US 2024/0400458 A1    Dec. 5, 2024

(30) Foreign Application Priority Data

Dec. 19, 2023  (CN) .......................... 202311744474.2

(51) Int. Cl.
  *C04B 33/04*    (2006.01)
  *C04B 33/13*    (2006.01)
  *C08K 3/34*    (2006.01)

(52) U.S. Cl.
  CPC .......... *C04B 33/04* (2013.01); *C04B 33/1305* (2013.01); *C08K 3/346* (2013.01)

(58) Field of Classification Search
  None
  See application file for complete search history.

(56) References Cited

U.S. PATENT DOCUMENTS

| | | | |
|---|---|---|---|
| 4,315,844 A * | 2/1982 | Aboytes ................... | C08K 9/04 525/352 |
| 2005/0203236 A1 | 9/2005 | Prowell et al. | |
| 2018/0207912 A1* | 7/2018 | Li ........................... | C08J 7/048 |
| 2020/0255655 A1 | 8/2020 | Lehenmeier et al. | |

FOREIGN PATENT DOCUMENTS

| CN | 101671448 A | 3/2010 |
|---|---|---|
| CN | 105669081 A | 6/2016 |
| CN | 110452430 A | 11/2019 |

OTHER PUBLICATIONS

CNIPA, First Office Action issued for Chinese Application No. 202311744474.2, mailed May 8, 2024 (7 pages).
Notification to Grant Patent Right for Invention, Chinese Application No. 202311744474.2, mailed May 27, 2024 (3 pages).

* cited by examiner

*Primary Examiner* — Stefanie J Cohen
(74) *Attorney, Agent, or Firm* — Daniel M. Cohn; Howard M. Cohn

(57) ABSTRACT

A method for preparing modified calcined kaolin particles with surface amphiphilicity. The method includes the steps of drying and sieving the calcined kaolin particles, adding ethanol, and stirring to obtain a suspension A, preparing an ethanol solution of a vinyl silane coupling agent, and stirring for a period of time at a certain temperature to obtain a solution B, dripping the solution B into the solution A, and stirring for a period of time at a certain temperature to obtain a suspension C, reducing the temperature of the suspension C, introducing nitrogen, adding a certain amount of sulfhydryl compound, stirring for a period of time at a certain temperature to obtain a suspension D, filtering, washing and drying to obtain the modified calcined kaolin particles.

11 Claims, No Drawings

MODIFIED CALCINED KAOLIN PARTICLE WITH SURFACE AMPHIPHILICITY AND PREPARATION METHOD THEREOF

TECHNICAL FIELD

The disclosure relates to the technical field of clay particle surface modification, and more specifically, to a modified calcined kaolin particles with surface amphiphilicity and a preparation method thereof.

BACKGROUND ART

Recently, polymer/kaolin composite materials have attracted increasing attention in the field of material science. The reason is that even in the case where the amount of kaolin particles added is small, the prepared composites often exhibit excellent performances in mechanical properties, thermal stability, flame retardant properties, or the like. However, when untreated natural kaolin is added directly to the matrix, and the two often fail to achieve good compatibility and thus affect product performance. The reason is that the affinity between the hydrophilic kaolin particles and the hydrophobic polymer is insufficient to allow a firm force to be developed between them. Therefore, prior to preparing the desired polymer/kaolin composite, the kaolin surface must be modified as necessary to allow good compatibility with the polymer matrix.

The existing surface modification method of the layered kaolin is mainly an intercalation modification method. The mechanism is that small molecular polar substances enter the interlayer of the kaolin crystal, breaking the original hydrogen bond and forming a new hydrogen bond with silicon oxide or hydroxyl groups as to enlarge the interlayer spacing, making it easier for other molecules to enter the kaolin layer for reaction. However, the intercalation modification has some defects, firstly, the reaction conditions are relatively harsh and often require melting, resulting low reaction efficiency. The second issue is that the intercalation agent is prone to be detached and intercalated, and the kaolin returns to its original structure after the intercalation agent is detached from the kaolin layer, so that the modification effect is affected.

The above problems are caused by the special layer stacking mode and layered structure unit of kaolin, and if the kaolin raw material used has no layered structure, the inconvenience caused by intercalation can be solved successfully. After the layered kaolin is calcined at a proper temperature, the crystal structure collapses, there is no longer hydrogen bonding between layers. At the same time, a small amount of Al—OH residues are remained in the calcining process, new reactive active sites of Al—O and Si—O are possibly generated in the calcining process, and proper modification of the surface of the calcined kaolin is entirely possible to be realized by utilizing the reactive points to react with a proper modifier.

Meanwhile, most researchers currently focus on the surface chemical modification of inorganic nanoparticles by simply transforming hydrophilicity into hydrophobicity, and even believe that the stronger hydrophobicity is better, while neglecting the convenience of using modified particles in the process of preparing composite materials. Although the hydrophobic particles have better compatibility with the polymer matrix, they tend to disperse only in some non-polar or weakly polar organic solutions, and cannot form good stable dispersion in strongly polar solution systems. The use of strongly polar solutions is also common in practical production processes, especially where large amounts of polymer monomers are only soluble in polar systems. Therefore, the surface of the calcined kaolin is subjected to controllable chemical modification, so that the calcined kaolin can be well dispersed in organic dispersion media with different polarities, and the calcined kaolin is very important and necessary for preparing polymer/inorganic nano particle composite materials.

From the above, it can be seen that the current reports mainly focus on the intercalation reaction of layered kaolin, which changes its surface property from hydrophilic to hydrophobic. However, there have been no reports on the preparation of the calcined kaolin particles with amphiphilicity by modifying the surface properties of the calcined kaolin to make it both hydrophilic and oleophilic.

In view of the foregoing, there is a need in the art for developing a calcined kaolin clay modified particle that achieves a good, stable, uniform distribution in a dispersion medium of different polarities.

SUMMARY

In order to solve the technical problems, the disclosure aims to provide modified calcined kaolin particles with surface amphiphilicity and a preparation method thereof. Wherein the modified particles have excellent amphiphilicity, and can be uniformly distributed both in a polar dispersion system and a non-polar dispersion system.

In order to achieve the above object, the disclosures provides a modified calcined kaolin particle having surface amphiphilicity and a method for preparing the same, the method includes the steps as follows.

(1) Drying and sieving calcined kaolin particles, adding monohydric alcohol, and stirring to obtain a suspension A;

(2) Preparing an ethanol solution of a vinyl silane coupling agent, and stirring for a period of time at a certain temperature to obtain a solution B;

(3) Dropwise adding the solution B into the solution A, and stirring for a period of time at a certain temperature to obtain a suspension C;

(4) Continuously introducing inert gas into the suspension C, adding a certain amount of sulfhydryl compound, stirring for a period of time at a certain temperature to obtain suspension D, filtering, washing and drying to obtain the modified calcined kaolin particles.

In the step (1) of the above preparation method, the calcined kaolin particles have a particle size of 3000 mesh, 6000 mesh or 10000 mesh. The concentration of the calcined kaolin in the suspension is 0.50 g/L to 50.00 g/L. Preferably, the suspension concentration is 5.00 g/L to 50.00 g/L.

In the step (1) of the above preparation method, the monohydric alcohol is methanol, ethanol or n-propanol.

In the step (2) of the preparation method, the vinyl silane coupling agent is one or more of vinyl trimethoxy silane, divinyl dimethyl silane or dimethyl phenyl vinyl silane. Preferably, the concentration of the vinyl silane coupling agent is 0.05 g/L to 5.00 g/L. More preferably, the mass ratio of calcined kaolin to vinyl silane coupling agent is 1:(0.1-0.5).

In the step (2) of the preparation method, the stirring temperature is 20-30° C. and the stirring time is 10 min-30 min.

In the step (3) of the preparation method, the reaction temperature of the reaction is 70-110° C. and the reaction time is 6 h-12 h.

The reaction temperature of the reaction in the step (4) of the preparation method is 50-100° C. and the reaction time is 2 h-8 h.

The inert gas in the step (4) of the preparation method is nitrogen, helium or argon.

The sulfhydryl compound in the step (4) is one or more of 2-mercaptoethanol, 4-mercapto-1-butanol, 3-mercapto-2-butanone, 4-mercaptobenzoic acid, 3-mercapto-1-propanol and 6-mercapto-1-hexanol. Preferably, the molar ratio of vinyl coupling agent to sulfhydryl compound is 1:(0.01-2.0). More preferably, the molar ratio of the two is 1:(0.1-1.0).

The disclosure also provides modified calcined kaolin particles with surface amphiphilicity, prepared by the method above, and are dispersed in ethanol, N, N-dimethylformamide, ethyl acetate and cyclohexane to form a stable and uniform suspension, wherein the concentration is 0.10 g/L.

The beneficial effects of the disclosure are as follows.

(1) The surface regulation modification method for calcined kaolin provided by the invention has the advantages of simple flow, mild conditions, low-cost and easily-obtained reagents, and the prepared modified particles can realize good dispersion in dispersion systems with different polarities, and have strong adaptability and wide application range.

(2) The modifier groups chemically coated on the surface of the modified calcined kaolin particles prepared by the invention contain a large number of hydrophilic and hydrophobic groups, and the two groups can be mutually cooperated in different polarity dispersion media, so that the contact between the modified particles and the dispersion media is reduced, the particle agglomeration phenomenon is reduced, and the purpose that the modified particles can be well, stably and uniformly dispersed in both polar and non-polar dispersion system is realized.

DETAILED DESCRIPTION OF THE EMBODIMENTS

The technical solution of the present invention will be described in detail below for a clearer understanding of technical features, objects and advantageous effects of the present invention, but should not be construed as limiting the scope of the present invention. In the examples, each of the starting reagent materials is commercially available, and the experimental methods without specifying the specific conditions are conventional methods and conventional conditions well known in the art, or according to the conditions recommended by the instrument manufacturer.

Embodiment I

This embodiment provides a modified calcined kaolin particle having surface amphiphilicity and a method of making the same, the method includes the steps as follows.

In the step 1, the calcined kaolin powder was placed in an oven, dried at 110° C. for 10 h, sieved by using a 6000-mesh standard sieve. Then 5.0000 g sieved calcined kaolin particles was weighted and 200 mL ethanol was added, and stirred to obtain a suspension.

In the step two, 0.5000 g vinyltrimethoxysilane is weighed, and 100 mL ethanol was added, and stirred for 20 min at 20° C.

In the third step, vinyl trimethoxysilane ethanol solution was dropwise added into the suspension. The dropwise adding time is 1 h, the reaction temperature was 80° C., and the reaction time was 8 h.

In the step four, nitrogen was continuously introduced after the reaction is finished, 0.3109 g of 3-mercapto-1-propanol was added, and reacted at the temperature of 80° C. for the reaction time of 8 h. The reacted solution was filtered, washed and dried to obtain the modified calcined kaolin particles.

In the step five, the obtained modified calcined kaolin particles were added into ethanol, N, N-dimethylformamide, ethyl acetate and cyclohexane to form a suspension, wherein the concentration is 0.10 g/L.

Embodiment 2

In the step 1, the calcined kaolin powder was placed in an oven, dried at 110° C. for 10 h, sieved by using a 6000-mesh standard sieve. Then 5.0000 g sieved calcined kaolin particles was weighted and 200 mL ethanol was added, and stirred to obtain a suspension.

In the step two, 1.0000 g vinyltrimethoxysilane is weighed, and 100 mL ethanol was added, and stirred for 20 min at 20° C.

In the third step, the vinyltrimethoxysilane ethanol solution was dropwise added into the suspension. The dropwise adding time is 1 h, the reaction temperature was 75° C., and the reaction time was 10 h.

In the step four, nitrogen was continuously introduced after the reaction is finished, 0.9056 g of 6-mercapto-1-hexanol was added, and reacted at the temperature of 95° C. for the reaction time of 8 h. The reacted solution was filtered, washed and dried to obtain the modified calcined kaolin particles.

In the step five, the obtained modified calcined kaolin particles were added into ethanol, N, N-dimethylformamide, ethyl acetate and cyclohexane to form a suspension, wherein the concentration is 0.10 g/L.

Embodiment 3

In the step 1, the calcined kaolin powder was placed in an oven, dried at 110° C. for 10 h, sieved by using a 6000-mesh standard sieve. Then 5.0000 g sieved calcined kaolin particles was weighted and 200 mL ethanol was added, and stirred to obtain a suspension.

In the step two, 1.0000 g diethyldimethylsilane is weighed, and 100 mL ethanol was added, and stirred for 20 min at 20° C.

In the third step, the diethyldimethylsilane ethanol solution was dropwise added into the suspension. The dropwise adding time is 1 h, the reaction temperature was 85° C., and the reaction time was 8 h.

In the step four, nitrogen was continuously introduced after the reaction is finished, 0.9567 g of 6-mercapto-1-hexanol was added, and reacted at the temperature of 85° C. for the reaction time of 6 h. The reacted solution was filtered, washed and dried to obtain the modified calcined kaolin particles.

In the step five, the obtained modified calcined kaolin particles were added into ethanol, N, N-dimethylformamide, ethyl acetate and cyclohexane to form a suspension, wherein the concentration is 0.10 g/L.

Controlled Example

This controlled example provides a method for modifying calcined kaolin particles, which includes the steps as follows.

Drying calcined kaolin powder in an oven at 110° C. for 10 h, sieving with a 6000-mesh standard sieve, weighing sieved calcined kaolin particles 5.0000 g, adding ethanol 200 mL, and stirring to obtain a suspension; weighing 0.5000 g vinyltrimethoxysilane, adding 100 mL ethanol, stirring at 20° C. for 20 min, adding vinyltrimethoxy ethanol solution into the suspension, heating to 70° C., stirring for reacting 12 h, filtering, washing and drying to obtain modified calcined kaolin particles.

TABLE 1

Dispersion of modified calcined kaolin particles prepared in examples in ethanol, N,N-dimethylformamide, ethyl acetate and cyclohexane (average particle diameter, nm)

| The Modified Particles | Ethanol | N,N-dimethylformamide | ethyl acetate | cyclohexane |
|---|---|---|---|---|
| The first embodiment | 1040 | 890 | 1120 | 3500 |
| The Second embodiment | 1200 | 1050 | 1200 | 3860 |
| The third embodiment | 980 | 850 | 1060 | 3690 |

As can be seen from the Table 1, the modified calcined kaolin particles prepared from the three different modifiers have good dispersion effect in ethanol, N, N-dimethylformamide, ethyl acetate and cyclohexane, are uniformly distributed, have smaller particle size and have no agglomeration phenomenon, and showed that the modified particles have excellent amphiphilicity.

TABLE 2

Dispersion of modified calcined kaolin particles prepared in controlled example in ethanol, N,N-dimethylformamide, ethyl acetate and cyclohexane (average particle diameter, nm)

| Modified Particles | Ethanol | N,N-dimethylformamide | Ethyl Acetate | cyclohexane |
|---|---|---|---|---|
| Controlled Example | 2880 | 2450 | 2690 | 8600 |

As can be seen from the Table 2, the modified calcined kaolin particles prepared by the conventional coupling agent modification method failed to achieve uniform dispersion in ethanol, N, N-dimethylformamide, ethyl acetate and cyclohexane, and the average particle size was much larger than that of the particles prepared in the three examples, and in particular, the particles prepared in the non-polar dispersion system of cyclohexane were poorly distributed, and serious particle agglomeration occurred.

Note that the above embodiments are only for illustrating the implementation and features of the present invention, not for limiting the technical method of the present invention, and although the present invention has been described in detail with reference to the above embodiments, it should be understood by those of ordinary skill in the art that: modifications and equivalents may be made thereto without departing from the spirit and scope of the invention, and any modifications and equivalents are intended to be included within the scope of the present invention.

What is claimed is:

1. A method for preparing modified calcined kaolin particles having surface amphiphilicity, comprising:
   drying and sieving the calcined kaolin particles, adding monohydric alcohol, and stirring to obtain a suspension A;
   preparing an ethanol solution of a vinyl silane coupling agent, and stirring for a period of time at a certain temperature to obtain a solution B;
   dropwise adding the solution B into the solution A, and stirring for a period of time at a certain temperature to obtain a suspension C;
   continuously introducing inert gas into the suspension C, adding a certain amount of sulfhydryl compound, stirring for a period of time at a certain temperature to obtain suspension D, filtering, washing and drying to obtain the modified calcined kaolin particles;
   wherein the sulfhydryl compound is one or more of 2-mercaptoethanol, 16-mercaptohexadecanoic acid, 4-mercapto-1-butanol, 3-mercapto-2-butanone, 4-mercaptobenzoic acid, 3-mercapto-1-propanol, and 6-mercapto-1-hexanol.

2. The method of claim 1, wherein in step of drying, the calcined kaolin particles have a particle size of 3000 mesh, 6000 mesh, or 10000 mesh and a concentration of the calcined kaolin in the suspension A is 0.50 g/L to 50.00 g/L.

3. The method of claim 2, wherein in step of drying, the suspension concentration is 5.00 g/L to 50.00 g/L.

4. The method of claim 1, wherein in the step of drying, the monohydric alcohol is methanol, ethanol or n-propanol.

5. The method of claim 1, wherein in the step of preparing, the vinyl silane coupling agent is one or more of vinyl trimethoxy silane, divinyl dimethyl silane, and dimethyl phenyl vinyl silane; and the concentration of the vinyl silane coupling agent is from 0.05 g/L to 5.00 g/L.

6. The method of claim 1, wherein in the step of preparing, a mass ratio of the calcined kaolin to the vinyl silane coupling agent is 1:(0.1-0.5).

7. The method of claim 1, wherein in the step of adding, the certain temperature is 70 to 110° C. and the reaction time is 6 h to 12 h.

8. The method of claim 1, wherein in the step of introducing, the certain temperature is 50 to 100° C. and the reaction time is 2 h to 8 h.

9. The method of claim 1, wherein in the step of introducing, the inert gas is nitrogen, helium or argon.

10. The method of claim 1, wherein in the step of introducing, a molar ratio of the vinyl coupling agent to the sulfhydryl compound is 1:(0.01-2.0).

11. The method of claim 10, wherein the molar ratio of the vinyl coupling agent to the sulfhydryl compound is 1:(0.1-1.0).

* * * * *